Figure 1:
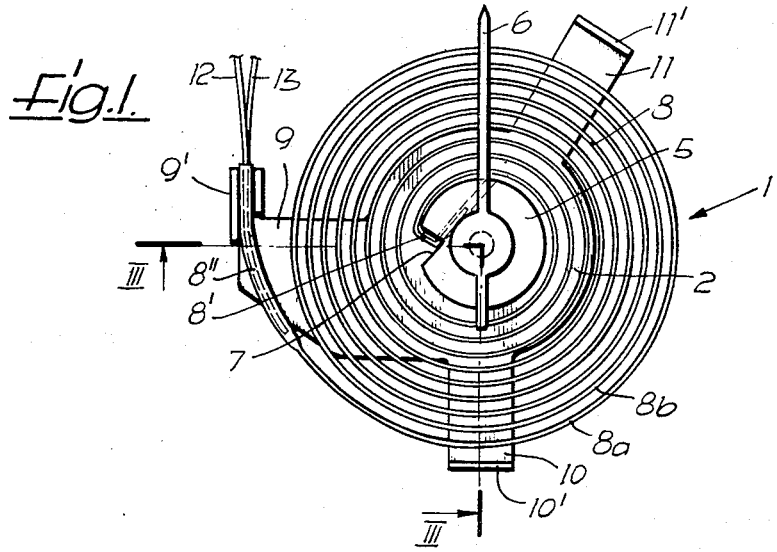

United States Patent
Koch

[15] 3,688,586
[45] Sept. 5, 1972

[54] MEASURING INSTRUMENT WITH A BOURDON SPRING

[72] Inventor: Hermann Koch, Augustenstrasse 87, 7 Stuttgart 1, Germany

[22] Filed: Nov. 6, 1970

[21] Appl. No.: 87,506

[30] Foreign Application Priority Data

Nov. 26, 1969   Germany..........P 19 59 206.4

[52] U.S. Cl.................................................73/418
[51] Int. Cl..................................................G01l 7/04
[58] Field of Search................................73/418, 411

[56] References Cited

UNITED STATES PATENTS

| | | | |
|---|---|---|---|
| 1,681,109 | 8/1928 | Fitts | 73/411 |
| 1,518,939 | 12/1924 | Schlaich | 73/411 X |
| 3,213,688 | 10/1965 | Huston | 73/418 |
| 2,495,314 | 1/1950 | Caldwell | 73/418 |

FOREIGN PATENTS OR APPLICATIONS 570,597   7/1945   Great Britain...............73/412

Primary Examiner—Louis R. Prince
Assistant Examiner—Daniel M. Yasich
Attorney—Arthur O. Klein

[57] ABSTRACT

A measuring instrument especially for measuring low pressures occurring, for example, in a temperature gauge, comprising a Bourdon tube which has a relatively thin wall thickness and is capable of turning the pointer on the inner end of the Bourdon tube to an angle of more than 180° from its zero setting, and at least one abutment for limiting the expansion of the outermost winding of the Bourdon tube.

4 Claims, 3 Drawing Figures

PATENTED SEP 5 1972　　　　　　　　　　　3.688.586

Inventor:

Hermann KOCH by: Arthur O. Klein
Attorney.

MEASURING INSTRUMENT WITH A BOURDON SPRING

The present invention relates to a measuring instrument which comprises a Bourdon tube which forms a single spring one end of which is connected to a capillary sensor and its other end to an indicating element, and which is adapted to deflect this indicating element directly and for a maximum angular distance of more than 180° from its zero setting.

The measuring instruments of this type as are known at present may be employed for measuring only very high pressures, while for relatively low pressures as occur, for example, in temperature gauges, their measuring accuracy and the constancy of their zero setting are much too low.

For this reason it is conventional to employ either a double Bourdon spring or a single Bourdon spring which is provided with a transmission gear in order to prevent the tubular material of the spring from being subjected to excessive strains when the indicating element is deflected for a large angular distance from its zero setting. Both of these constructions have, however, considerable disadvantages. The double spring is very expensive, especially because of the necessary adjusting work which has to be carried out after such a spring has been wound. Furthermore, the space required by such a spring in the axial direction is more than twice as large as that required by a single spring. The measuring instruments which are provided with transmission gears likewise require a large space in the axial direction. Furthermore, such a gear has not only the disadvantage of being expensive but also of being affected by temperature variations which may be very considerable in measuring instruments of the type which are employed primarily for temperature gauges.

It is an object of the present invention to provide a measuring instrument which comprises a single Bourdon spring the outer end of which is connected to a capillary sensor, while its inner end is directly connected to an indicating element in the form of a pointer, and which is adapted to deflect this pointer from its zero setting for a maximum angular distance of more than 180° and operates at a much higher accuracy and requires considerably less space than similar measuring instruments as were designed prior to this invention.

For attaining this object, the present invention provides at least one abutment which is adapted to limit the outward expansion of the outermost winding of the single tubular Bourdon spring and which is radially spaced from this outer winding when the indicating element is in its zero position. The invention further requires the spirally shaped tube forming the Bourdon spring to have such a wall thickness that it permits the outermost winding to expand until it engages firmly upon the abutment when the spring reaches the limit of the desired measuring range.

By providing the Bourdon spring in the form of a single spring which is connected directly to the indicating element, the instrument according to the invention saves the space which in the known measuring instruments is required in the axial direction either by the second section of a double spring or by a gear transmission between the single spring and the indicating element. In order to permit the indicating element despite the use of a single spring to be capable of deflecting for an angular distance of more than 180° from its zero setting without subjecting the tubular material of the spring to excessive stresses, the invention provides the tube forming the Bourdon spring which is pressed to a flat cross-sectional shape to be made of a very small wall thickness, and it further provides an excessive expansion of the outermost winding of this spring to be prevented by the provision of one or more abutments upon which this winding will engage when it reaches the desired limit of the indicating range of its pointer or the like. Such an abutment or abutments for the outermost winding are desirable or necessary since it has been found that this outermost winding will be subjected to material stresses more than all other windings of the spirally coiled spring. Since this outer winding is, however, protected from being deformed more than admissable by its engagement with the abutment or abutments, the low wall thickness of the Bourdon spring according to the invention which is considerably smaller than that of the known Bourdon springs permits the deformation of the inner windings of this new spring also to be utilized so as to permit the inner end of the spring to move easily and without exerting any excessive stresses upon the spring material about an angle which may amount, for example, to 360°. Apart from the considerable saving in space, the measuring instrument according to the invention has the further important advantage that it may be built at a much lower cost than one of the known measuring instruments as previously described which permits its indicating element to deflect for an angular distance of more than 180° from its zero setting.

One preferred embodiment of the invention is provided with two abutments for the outermost winding of the Bourdon spring, the first of which is offset at an angle of about 90° from the outer end of the spring in the direction toward its inner end, while the second abutment is offset at an angle between 90° and 180° from the first abutment and likewise in the direction toward the inner end of the spring. These two abutments which suffice to protect the material of the outermost winding of the Bourdon spring from being subjected to excessive stresses may simply be formed by bending the ends of two arms of a base plate carrying the shaft of the indicating element and the spring at a right angle to the plane of this plate. The outer end of the spring is preferably secured to another arm or an extension of the base plate the outer end of which is likewise bent at a right angle to the plane of this plate.

When the indicating element or pointer of the instrument is located in its zero position, each of the abutments is preferably spaced from the outermost winding of the spring at a distance which is the larger the greater the angular distance is made between the respective abutment and the outer end of the spring. This permits the outermost winding to expand to a maximum extent. When employing two abutments one of which is offset at an angle of about 90° and the other at an angle of about 180° to 270° relative to the outer end of the Bourdon spring, the first abutment is spaced from the outermost winding of this spring at a distance which is substantially equal to the distance between this winding and the next-following winding, while the second abutment is spaced from the outer most winding at a distance which is equal to about twice to four times the distance between the outermost winding and the nextefollowing winding of the spring.

Instead of limiting the expansion of the outermost winding of the Bourdon spring by the abutment or abutments, this limitation may also be attained by reinforcing at least a part of the length of this winding beginning at the outer end of the spring. Such a reinforcement may consist, for example, of the end section of a capillary tube which is inserted into the open end of the spring and connects the spring with the measuring sensor.

Of course, instead of providing two or more abutments, it is also possible to combine them into a single continuous abutment which may be of an at least partly circular shape and projects at a right angle to the plane of the base plate and surrounds at least a considerable part of the outermost winding of the Bourdon spring.

Figure 2:
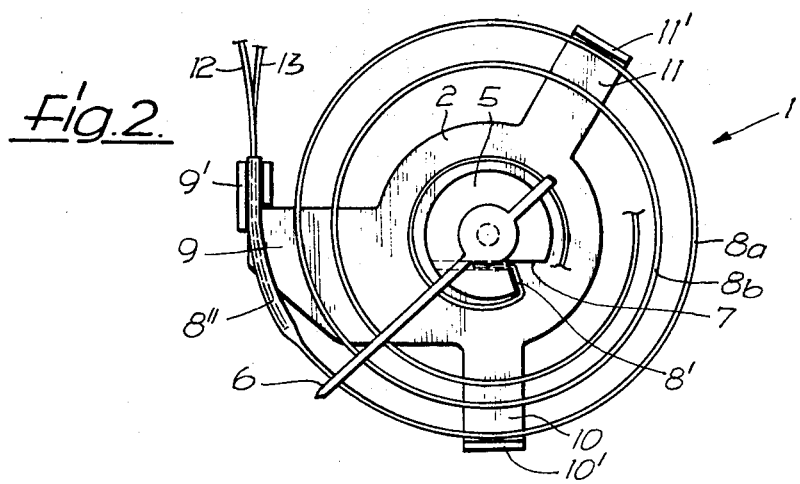
Figure 3:
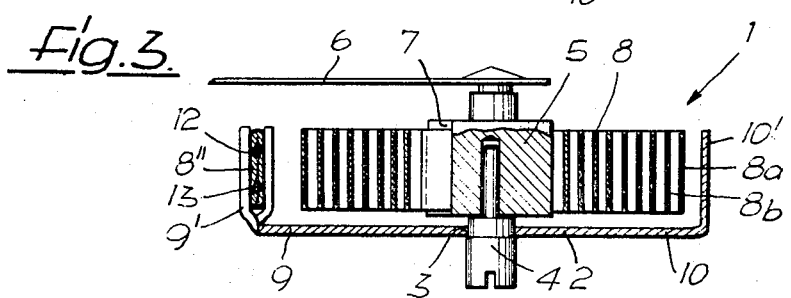

The features and advantages of the present invention will become further apparent from the following detailed description of one embodiment thereof which is to be read with reference to the accompanying drawings, in which FIG. 1 shows a top view of the measuring instrument according to the invention in the position in which the indicating element is in its zero position;

FIG. 2 shows a top view of the same measuring instrument in the position in which the indicating element is deflected to an angle of approximately 220°; while FIG. 3 shows a cross section which is taken along the line III — III of FIG. 1.

As illustrated in the drawings, the measuring instrument1according to the invention which is designed especially for a temperature gauge comprises a stamped base plate 2 the central circular area of which is provided with a central bore 3 in which a pin 4 is rigidly secured which, in turn, is rotatably mounted in a housing, not shown, and is adapted to be turned together with the base plate 2 by means of a screw driver or similar tool. This pin 4 forms a trunnion on which a cylindrical element 5 is rotatable which is provided, on the end opposite to that facing the base plate 2, with a pointer 6 which is adapted to sweep over a dial, not shown.

The peripheral surface of the cylindrical element 5 is provided with an axially extending notch 7 in which the inner end 8' of a Bourdon spring 8 is secured which is wound of a flat tube forming a single spring the windings of which are all disposed within the same plane. The outer end 8" of this spring is inserted into the bifurcated free end 9' of a radial arm 9 of base plate 2 and is soldered to this end which is bent over at a right angle to the plane of the base plate and its arm 9.

A second radial arm 10 of base plate 2 extends at an angle of 90° to the first arm 9, as seen in the counterclockwise direction, that is, in the direction from the outer end 8" toward the inner end 8' of the Bourdon spring 6. The free end of this second arm 10 is bent over at a right angle like the end of the first arm and forms a first abutment 10' which is adapted to limit the outward expansion of the outermost winding 8a of spring 8. When the pointer 6 is in its zero position, the first abutment 10' is spaced from the outermost winding 8a of the spring at substantially the same distance as this winding is spaced from the next following winding 8b.

A third arm 11 of base plate 2 extends at an angle of approximately 250° to the first arm 9, as seen in the counterclockwise direction from the outer toward the inner end of spring 8. The free end of this arm 11 is bent over like that of the second arm 10 and forms a second abutment 11' for the outermost winding 8a. When the pointer 6 is in its zero position, this second abutment 11' is spaced from the next-following winding at a distance which is approximately 3 times as large as the distance between the outermost winding 8a from the next-following winding 8b.

The wall thickness of the tubular material of which the Bourdon spring 8 is wound after the tube has been pressed flat is smaller than that of the conventional Bourdon springs of a similar size, but it is still sufficient so that no excessive strain will occur in the material of this spring when its outermost winding 8a engages upon the abutments 10' and 11'.

A capillary tube 12 which leads to a sensor, not shown, is inserted into the outer end 8" of the Bourdon spring 8, for example, for a distance which corresponds to an angle of about 30° to 40°. A second capillary tube 13 is likewise inserted into the outer end 8" of the Bourdon spring 8 and also for approximately the same distance as the first tube 12. The outer end of this second capillary tube 13 is, however, closed. The two capillary tubes 12 and 13 reinforce the outer end 8" of the Bourdon spring 8 which is tightly closed by solder.

When the pressure of the fluid increases which is contained in the Bourdon spring 8, the capillary tube 12 and the sensor, it causes the Bourdon spring to expand with the result that its inner end 8' will turn around the pin 4 and will thereby take along the cylindrical element 5. The abutments 10' and 11' will then prevent the outermost winding 8a from expanding excessively and will thus protect this winding from being subjected to an excessive strain. The further inwardly disposed windings are not subjected to the danger of expanding excessively. However, because of the low wall thickness of the tube forming the Bourdon spring 8, it will still expand so much that the pointer 6 will be able to deflect to a maximum angle of, for example, 270° as illustrated in FIG. 2 without danger that the material of the spring will be excessively strained.

For accurately adjusting the position of the pointer 6 to its zero setting on the dial (not shown), it is only necessary to turn the pin 4 together with the base plate 10, its arms 9, 10 and 11, the abutments 10' and 11', and the outer end of spring 8 on the arm 9 by means of a screw driver in one direction or the other relative to the housing (not shown) of the instrument to which the dial is secured.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. A measuring instrument comprising a single tubular Bourdon spring, an indicating element connected directly to the inner end of said spring and adapted to be deflected for an angular distance of more than 180° from its zero position, a sensor connected to the outer end of said spring, base plate having at least one circumferential abutment against which the outer surface of the outermost winding of said spring is adapted to engage so as to limit its expansion, said abutment being radially spaced from said outermost winding when said indicating element is located in its zero position, said tubular spring having a wall thickness which permits said spring to expand from said zero position until said outermost winding engages with said abutment, a spring support to which the inner end of said spring and said indicating element are secured and disposed substantially centrally of said spring, a bearing pin secured to said base plate and around which said support together with said spring are adapted to rotate, said circumferential abutment projecting at a substantially right angle to the plane of said base plate, and the outer end of said spring being secured to said circumferential abutment.

2. A measuring instrument as defined in claim 1, in which, when said indicating element is in its zero position, said circumferential abutment is radially spaced from said outermost winding at a distance at least equal to the radial distance between said outermost winding and the next-following winding.

3. A measuring instrument as defined in claim 1, in which at least a part of the length of said outermost winding beginning at the outer end of said spring is reinforced.

4. A measuring instrument as defined in claim 3, further comprising a capillary tube inserted into the outer end of said tubular spring and extending from said end within said spring for at least a part of the length of said outermost winding so as to reinforce the same, said capillary tube having an outer end projecting from the outer end of said spring and connecting said spring to said sensor.

* * * * *